US008419858B1

(12) United States Patent
Haydock

(10) Patent No.: US 8,419,858 B1
(45) Date of Patent: Apr. 16, 2013

(54) METHOD AND SYSTEM FOR REMOVING ORGANIC COMPOUDS IN A CLOSED LOOP SYSTEM

(75) Inventor: Frederick J. Haydock, Murray, UT (US)

(73) Assignee: Haydock Intellectual Properties, LLC, Murray, UT (US)

( * ) Notice: Subject to any disclaimer, the term of this patent is extended or adjusted under 35 U.S.C. 154(b) by 1886 days.

(21) Appl. No.: 11/007,936

(22) Filed: Dec. 8, 2004

(51) Int. Cl.
*C02F 1/32* (2006.01)

(52) U.S. Cl.
USPC .......... 134/1; 134/10; 210/748.01; 210/748.1; 210/748.13

(58) Field of Classification Search ............... 134/1, 10; 210/748, 763; 422/186.3
See application file for complete search history.

(56) References Cited

U.S. PATENT DOCUMENTS

| | | | |
|---|---|---|---|
| 4,892,712 A * | 1/1990 | Robertson et al. ............ 422/186 |
| 4,941,957 A | 7/1990 | Zeff et al. ................... 204/157.3 |
| 4,990,260 A | 2/1991 | Pisani ............................ 210/664 |
| 5,126,111 A * | 6/1992 | Al-Ekabi et al. .............. 210/748 |
| 5,273,662 A | 12/1993 | Muisener et al. ............. 210/734 |
| 5,364,508 A | 11/1994 | Weres et al. ................. 204/128 |
| 5,411,889 A | 5/1995 | Hoots et al. ....................... 436/6 |
| 5,419,824 A | 5/1995 | Weres et al. ................. 204/268 |
| 5,435,969 A | 7/1995 | Hoots et al. ..................... 422/14 |
| 5,439,577 A | 8/1995 | Weres et al. ................. 204/268 |
| 5,439,652 A * | 8/1995 | Sczechowski et al. ..... 422/186.3 |
| 5,552,059 A | 9/1996 | Chow ............................. 210/747 |
| 5,580,461 A | 12/1996 | Cairns et al. ................... 210/673 |
| 5,779,912 A * | 7/1998 | Gonzalez-Martin et al. . 210/748 |
| 5,785,864 A | 7/1998 | Teran et al. .................... 210/739 |
| 5,919,422 A | 7/1999 | Yamanaka et al. ............ 422/121 |
| 5,965,479 A | 10/1999 | Suzuki et al. ................... 502/182 |
| 5,965,771 A | 10/1999 | King et al. ..................... 562/580 |
| 5,972,196 A | 10/1999 | Murphy et al. ............... 205/466 |
| 5,989,407 A | 11/1999 | Andrews et al. .............. 205/626 |
| 6,055,085 A * | 4/2000 | Nakashima et al. .......... 359/241 |
| 6,090,294 A | 7/2000 | Teran et al. .................... 210/739 |
| 6,090,736 A | 7/2000 | Taoda et al. ....................... 502/5 |
| 6,096,219 A | 8/2000 | Green et al. ................... 210/695 |
| 6,117,335 A | 9/2000 | Bender ......................... 210/745 |
| 6,200,466 B1 | 3/2001 | Bender ......................... 210/96.1 |
| 6,221,259 B1 | 4/2001 | Kittrell ......................... 210/748 |
| 6,251,264 B1 | 6/2001 | Tanaka et al. ................ 210/96.1 |
| 6,281,802 B1 | 8/2001 | Venable et al. ............... 340/612 |
| 6,291,067 B1 | 9/2001 | Taoda et al. .................. 428/375 |
| 6,361,697 B1 | 3/2002 | Coury et al. .................. 210/759 |
| 6,387,241 B1 | 5/2002 | Murphy et al. ............... 205/626 |
| 6,461,487 B1 | 10/2002 | Andrews et al. .............. 204/262 |
| 6,524,447 B1 | 2/2003 | Carmignani et al. ...... 204/158.2 |
| 6,551,474 B1 | 4/2003 | Andrews et al. .............. 204/266 |
| 6,576,096 B1 | 6/2003 | Andrews et al. .............. 204/262 |
| 6,585,863 B2 | 7/2003 | Davydov et al. ........... 204/157.3 |
| 6,620,210 B2 | 9/2003 | Murphy et al. ................ 8/149.1 |

* cited by examiner

*Primary Examiner* — Michael Barr
*Assistant Examiner* — Ryan Coleman
(74) *Attorney, Agent, or Firm* — Thorpe North & Western LLP

(57) ABSTRACT method and system for decomposing organic compounds in wastewater that uses an interaction between an acid, a permeable structure and ultra violet light to accelerate the decomposition of organic compounds in wastewater. This invention can be used to decomposing organic compounds in industrial process and wastewater discharges, municipal drinking water supplies, food processing rinse water and commercial and residential water purification systems.

6 Claims, 3 Drawing Sheets

METHOD AND SYSTEM FOR REMOVING ORGANIC COMPOUDS IN A CLOSED LOOP SYSTEM

BACKGROUND OF INVENTION

1. Field of the Invention

This invention relates to methods and systems for removing organic compounds in water. More specifically, this invention relates to methods and systems that accelerate the decomposition of organic compounds through the use of activated oxidizing agents.

2. Description of Related Art

A variety of techniques are well known for cleaning organic materials from water supplies. Typically, these prior techniques are relatively slow and expensive and do not use combinations of oxidizing agents to accelerate the process of decomposition of the undesirable organic compounds.

Although the following references may not necessarily constitute "prior art," the reader is referred to these U.S. patent documents for general background material. Each of these documents is hereby incorporated by reference it its entirety for the material contained therein.

U.S. Pat. No. 4,941,957 describes a method and apparatus for rate enhanced decomposition of volatile organic halogenated compounds.

U.S. Pat. No. 4,990,260 describes a method and apparatus for removing contaminants in waters used for industrial cleaning.

U.S. Pat. No. 5,273,662 describes a process for treating impregnation porosity of porous articles.

U.S. Pat. No. 5,364,508 describes an electrochemical method for producing hydroxyl free radicals and decomposing by oxidation chemical substances dissolved in water.

U.S. Pat. No. 5,411,889 describes a target-specie responsive regulation of a water treatment agent.

U.S. Pat. No. 5,419,824 describes the use of an electrode at a sufficiently positive anodic potential to produce hydroxyl free radicals and release them into solution.

U.S. Pat. No. 5,435,969 describes a concentration-fluctuation responsive regulation of water treatment agent feed achieved by adding an incipient to a sample whereby a concentration indicator is formed.

U.S. Pat. No. 5,439,577 describes an electrochemical water treatment device for producing hydroxyl free radicals and decomposing by oxidation chemical substances dissolved in water.

U.S. Pat. No. 5,552,059 describes a process to decontaminate soil containing a chlorinated phenol compound.

U.S. Pat. No. 5,580,461 describes a continuous process for treating a fluid comprising at least one chemical contaminant.

U.S. Pat. No. 5,785,864 describes an apparatus and method for treating a fluid with ozone.

U.S. Pat. No. 5,919,422 describes a photo-catalyzer for deodorizing, cleaning, sterilizing and water purifying operations.

U.S. Pat. No. 5,965,479 describes an activated carbon and process for producing the same.

U.S. Pat. No. 5,965,771 describes a regeneration of carboxylic acid-laden basic sorbents by leaching with a volatile base in an organic solvent.

U.S. Pat. No. 5,972,196 describes methods of using ozone to sterilize instruments and medical wastes.

U.S. Pat. No. 5,989,407 describes an ozone generation delivery system that lends itself to small-scale applications and requires very low maintenance.

U.S. Pat. No. 6,090,294 describes an apparatus and method for the purification of contaminated water.

U.S. Pat. No. 6,090,736 describes a photocatalytic powder for environmental clarification.

U.S. Pat. No. 6,096,219 describes a method for the pretreatment of hazardous biological and chemical contaminates from a fluid stream.

U.S. Pat. No. 6,117,335 and U.S. Pat. No. 6,200,466 B1 describe a reactor system for decontamination of water by photolytic oxidation, utilizing near blackbody radiation.

U.S. Pat. No. 6,221,259 B1 describes a process and catalyst for the conversion of contaminants in an oxygen containing contaminated stream.

U.S. Pat. No. 6,251,264 B1 describes a method for purifying water containing organic matter.

U.S. Pat. No. 6,281,802 B1 describes an alarm and pump control system for automatic chlorinators of the type used with septic treatment systems.

U.S. Pat. No. 6,291,067 B1 describes a photocatalytic power for environmental clarification.

U.S. Pat. No. 6,361,697 B1 describes methods for decontaminating contaminated water that comprises treating the contaminated water with oxidizers.

U.S. Pat. No. 6,387,241 B1 describes method of using ozone which sterilizes instruments and medical wastes.

U.S. Pat. No. 6,461,487 B1 describes an ozone generation and delivery system.

U.S. Pat. No. 6,524,447 B1 describes an apparatus and method for the photocatalytic purification and ultra purification of water.

U.S. Pat. No. 6,551,474 B1 and U.S. Pat. No. 6,576,096 B1 describe an ozone generation and delivery system.

U.S. Pat. No. 6,585,863 B2 describes some use of photocatalytic degradation of organic compounds.

U.S. Pat. No. 6,620,210 B2 describes methods of using ozone to sterilize instruments and medical wastes.

SUMMARY OF INVENTION

It is desirable to provide a method and system for decomposing and/or removing organic compounds in industrial processes, wastewater discharges, municipal drinking water supplies, food processing rinse water and residential or commercial water purification systems. It is particularly desirable to provide a method and system for removing organic compounds from water where the decomposition of the organic compounds is accelerated using oscillating UV light and oxidizing cartridges and agents.

Accordingly, it is an object of an embodiment of this invention to provide a method and system for decomposing organic compounds in a water system.

It is an object of an embodiment of this invention to provide a method and system for decomposing organic compounds in a water system that accelerates the decomposition of the organic compounds.

It is another object of an embodiment of this invention to provide a method and system for decomposing organic compounds in a water system that works with industrial process water systems.

It is another object of an embodiment of this invention to provide a method and system for decomposing organic compounds in a water system that works with wastewater discharge systems.

It is another object of an embodiment of this invention to provide a method and system for decomposing organic compounds in a water system that works with municipal drinking water supplies.

It is another object of an embodiment of this invention to provide a method and system for decomposing organic compounds in a water system that works with food processing rinse water.

It is another object of an embodiment of this invention to provide a method and system for decomposing organic compounds in a water system that works with residential or commercial water purification systems.

It is another object of an embodiment of this invention to provide a method and system for decomposing organic compounds in a water system that can continuously recycle contaminated water until the organic containing compounds have be reduced to carbon dioxide, water and hydrogen peroxide.

It is a still further object of an embodiment of this invention to use oscillating UV lamps to activate one or more oxidizing agents.

It is a still further object of an embodiment of this invention to use an alumina/TiO2 porous oxidation cartridge.

Additional objects, advantages, and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described the preferred embodiment of this invention, simply by way of illustration of one of the modes best suited to carry out this invention. As it will be realized, this invention is capable of other different embodiments, and its several details, and specific portions are capable of modification in various aspects without departing from the invention. Accordingly, the drawings and descriptions should be regarded as illustrative in nature and not as restrictive.

BRIEF DESCRIPTION OF DRAWINGS

The accompanying drawings incorporated in and forming a part of the specification, illustrate present preferred embodiments of the invention. Some, although not all, alternative embodiments are described in the following description. In the figures.

Reference will now be made in detail to the present preferred embodiments of the invention, examples of which are illustrated in the accompanying drawings.

DETAILED DESCRIPTION

This invention is a system for accelerating the decomposition of organic compounds in water supplies. In some embodiments, the inlet and outlet of the system can be connected so as to permit continuous recycling of the contaminated water until the organic compounds have been reduced to an acceptable level. In its present embodiment this invention employs standard Ultra Violet (UV) lamps, operating on a variable frequency power supply to create a UV strobe or strobe-like effect to accelerate the reaction rate of the oxidizing agent. The present oxidizing agent is a hydrogen peroxide. Peracetic acid, or in other alternative embodiments perchloric acid, of varying concentrations as desired, is injected into the influent stream and which diffuses through a porous structure, which in the present embodiments are one or more cylindrical cartridges or one or more porous disks, to thereby, in combination with the UV light, oxidize the organic compounds into water, carbon dioxide and hydrogen peroxide. The present cylinders and disks are made of a composition of alumina ($Al_2O_3$) and titanium dioxide (TiO2). TiO2 is a desired agent in the photo catalysis remediation of wastewater because the process typically occurs under ambient conditions, it avoids the formation of intermediate products, it facilitates oxidation of substrates to $CO_2$, it can be supported on various reactor substrates and it has been demonstrated to be effective in the industrial detoxification of wastewater. Photocatalytic oxidation (PCO) has been used to break down and destroy many types of organic pollutants, including bacteria, viruses, by breaking down organics into the simpler components of water and $CO_2$. Photo catalysis has been proven to not only remove pollutants from water, but also to remove undesirable color, taste and odor compounds. Peracetic acid is preferred because it is demonstrated as a strong disinfectant and as an excellent sanitization agent and has exhibited effectiveness in eliminating microbes, such as the osmotolerant microbes.

Figure 1:
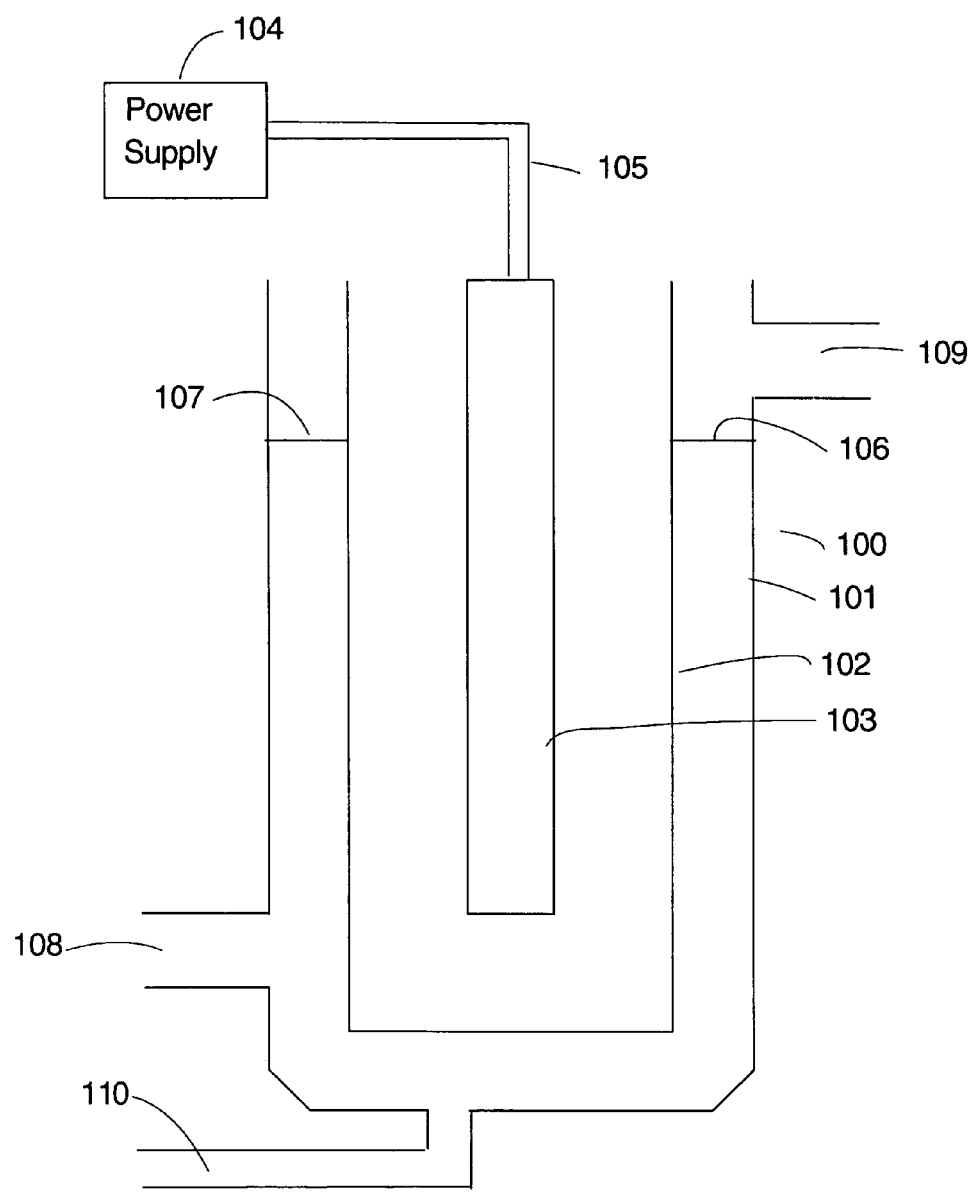
FIG. 1 is a schematic diagram of a first embodiment of the system of an embodiment of this invention.

FIG. 1 shows a schematic diagram of a first embodiment of the system 100 of an embodiment of this invention. A chamber 101 is provided to contain the processing components and to hold the contaminated water for processing. The chamber 101 has a first inlet 108 for receiving an inflow of contaminated water and a second inlet 110 for receiving the solution of peracetic acid. The peracetic acid can be replaced by a chemically equivalent chemical composition, such as but not limited to perchloric acid, without departing from the concept of this invention. The chamber 101 is also provided with an outlet 109. In some embodiments of this invention the outlet 109 is selectively connected to the inlet 108 to allow the selection of continuous repeated decontamination of the flow until a desired level of decontamination is achieved. Within the chamber 101 of this embodiment is one or more porous cylindrical cartridge(s) 102. This cartridge 102 is both light and water permeable, and in the present embodiment is between 60 and 70% porous. Seals 106, 107 are provided between the porous cartridge 102 and the chamber 101, thereby inducing the influent to flow from the inlet 108, through the porous cartridge 102 to the outlet 109. Within the cartridge 102 is a UV light source 103. This UV light source 103 is powered by a variable frequency power supply 104, which is electrically connected 105 to the UV light source 103. The UV light source 103, typically a coated glass tube containing an emitter or coil tuned to the UV frequency range and generally producing light waves in the range of from 300 to 800 nm, emits light, which excites electrons in the cartridge(s) to thereby accelerate the rate of reaction of the organic compounds in the influent stream.

Figure 2:
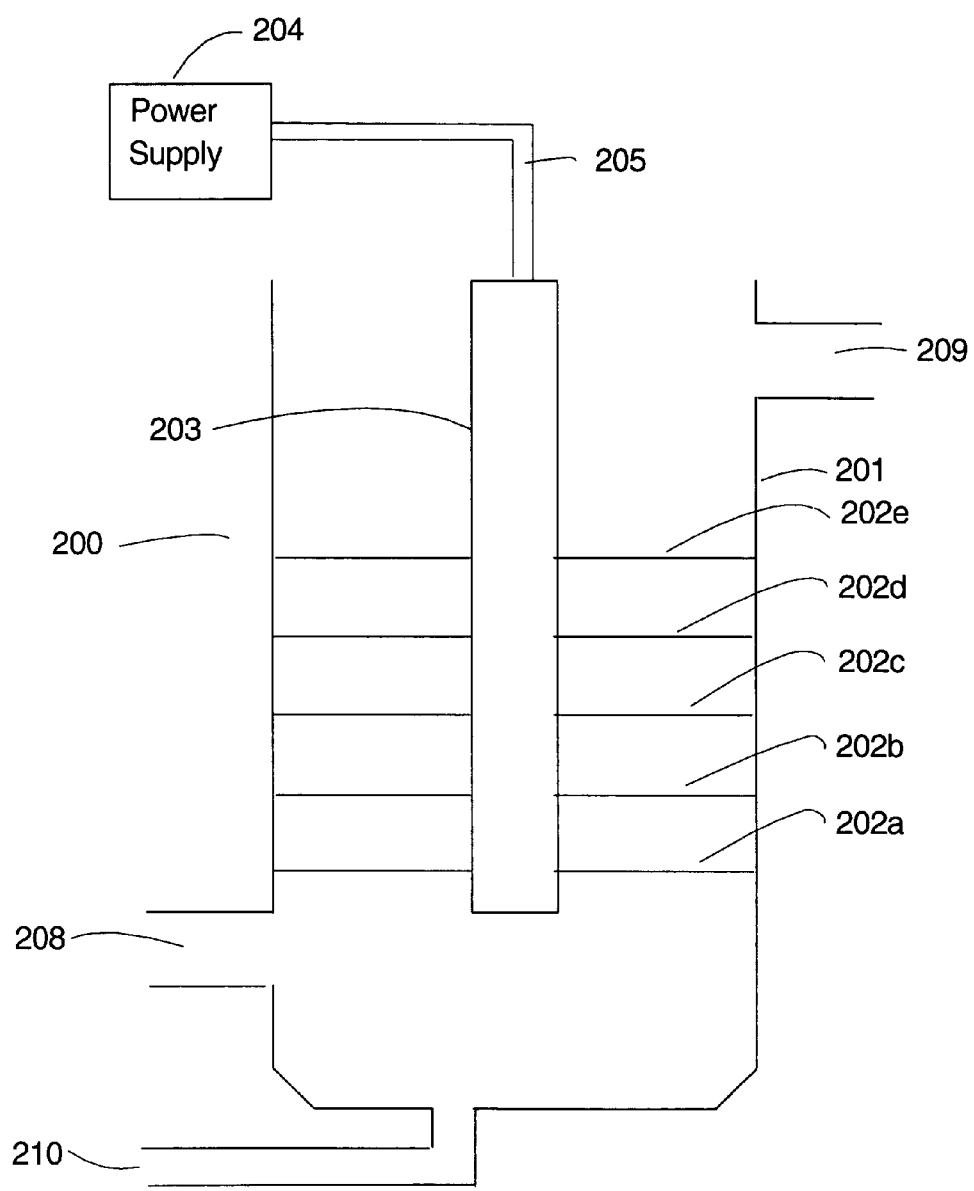
FIG. 2 is a schematic diagram of a second embodiment of the system of an embodiment of this invention.

FIG. 2 shows a schematic diagram of a second embodiment 200 of the system of an embodiment of this invention. Again, a chamber 201 is provided to contain the processing components and to hold the contaminated water for processing. The chamber 201 has a first inlet 208 for receiving an inflow of contaminated water and a second inlet 210 for receiving the solution of peracetic acid, or alternatively perchloric acid or the like. The peracetic (or perchloric or the like) acid can be replaced by a chemically equivalent chemical composition without departing from the concept of this invention. The chamber 201 is also provided with an outlet 209. In some embodiments of this invention the outlet 209 is selectively connected to the inlet 208 to allow the selection of continuous repeated decontamination of the flow until a desired level of decontamination is achieved. Within the chamber 201 of this embodiment is one or more porous disk(s) 202*a-e*. These disks 202*a-e* is both light and water permeable, and in the present embodiment is between 60 and 70% porous. Within the chamber 201 and generally intersecting the center of the disk(s) 202*a-e* is a UV light source 203. This UV light source 203 is powered by a variable frequency power supply 204, which is electrically connected 205 to the UV light source 203. The UV light source 203, typically a coated glass tube containing an emitter or coil tuned to the UV frequency range and generally producing light waves in the range of from 300 to 800 nm, emits light, which excites electrons in the cartridge(s) to thereby accelerate the rate of reaction of the organic compounds in the influent stream.

Figure 3:
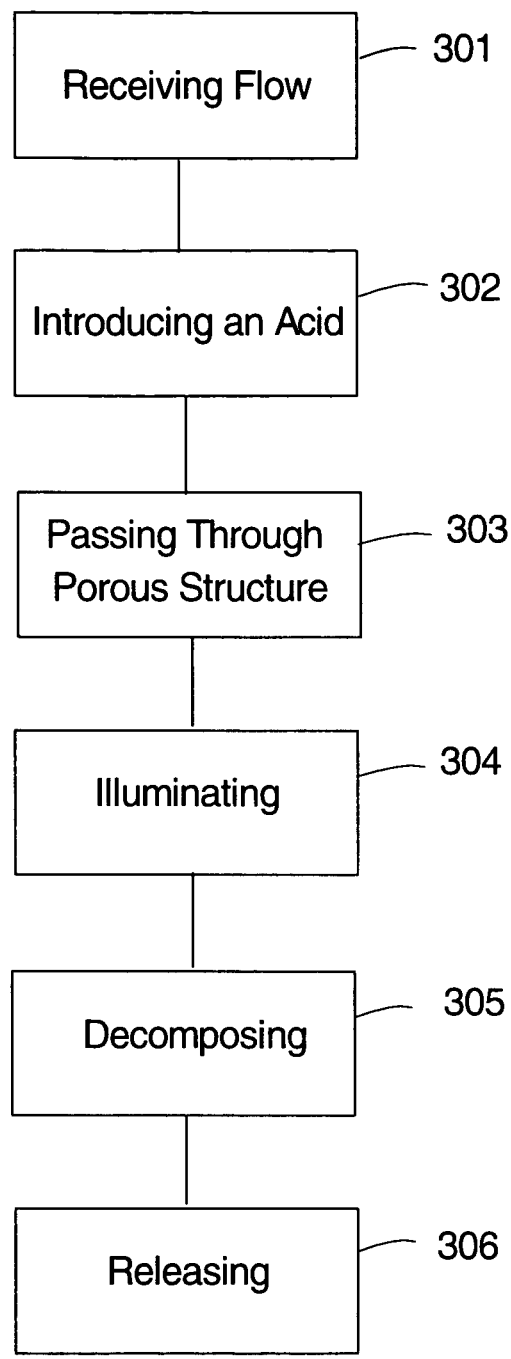
FIG. 3 is a flow chart of the present process of this invention.

FIG. 3 shows a flow chart of the present process of this invention. It should be understood that the steps of this process need not necessarily be performed in any particular order, rather the steps are presented here in one present and possible order. The applicant expects that the order of the steps can be changed without departing from the concept of this invention. A flow of contaminated water is received 301. An acid, presently peracetic acid although alternative compositions such as perchloric acid can be substituted without departing from the concept of this invention, is introduced 302 to the flow of contaminated water forming a combination. The combination is passed 303 through a porous structure, presently either one or more cylinders and/or one or more disks. The combination is illuminated 304 with light, typically in the present embodiment ultra violet light, which may be a light that is intermittent, pulsed, strobed or varied in frequency, although it is possible that an alternative light could be substituted without departing from the concept of this invention. Organic compounds in the received flow are decomposed 305 to produce a decontaminated water flow. The decontaminated water flow is released 306. In some envisioned embodiments of this process the steps may be repeated either individually or in groups until the desired decontamination is achieved.

The foregoing description of the present embodiments of this invention have been presented for the purposes of illustration and description of the best modes of the invention currently known to the inventor. It is not intended to be exhaustive or to limit the invention to the precise form disclosed. Obvious modifications or variations are possible and foreseeable in light of the above teachings. These embodiments of the invention were chosen and described to provide the best illustration of the principles of the invention and its practical application to thereby enable one of ordinary skill in the art to make and use the invention in various embodiments and with various modifications as are suited to the particular use contemplated. All such modifications and variations which are within the scope of the appended claims, when then are interpreted in accordance with the breadth to which they are fairly, legally and equitably entitled, should be considered within the scope of this invention.

The invention claimed is:

1. A method for removing organic compounds, comprising:
   A. receiving a flow of contaminated water;
   B. introducing to said flow of contaminated water an acid;
   C. passing said acid and contaminated water through a porous structure, wherein said porous structure is a light and water permeable disk comprising alumina;
   D. illuminating said acid and contaminated water with light; and
   E. decomposing organic compounds in said contaminated water to produce a decontaminated water flow; and
   F. releasing said decontaminated water flow.

2. A method for removing organic compounds, as recited in claim 1, wherein said introduced acid is selected from the group consisting of peracetic acid and perchloric acid.

3. A method for removing organic compounds, as recited in claim 1, wherein said porous structure is further composed of $TiO_2$.

4. A method for removing organic compounds, as recited in claim 1, wherein said light is ultra violet light.

5. A method for removing organic compounds, as recited in claim 1, wherein said light is strobed or intermittent light.

6. A method for removing organic compounds, as recited in claim 1, wherein the decomposing organic compounds in said contaminated water to produce a decontaminated water flow comprises accelerating a rate of reaction of the organic compounds.

\* \* \* \* \*